July 27, 1937.  W. M. WEST  2,087,942
CORK COMPOSITION
Filed May 22, 1935
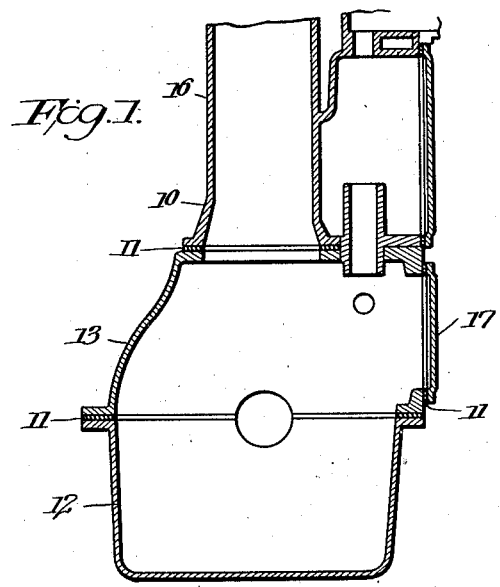
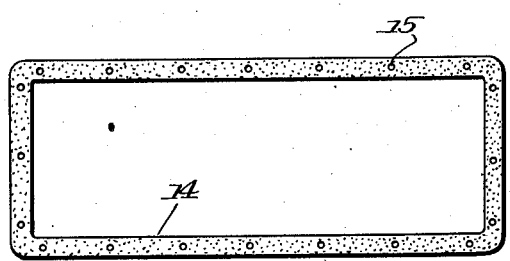
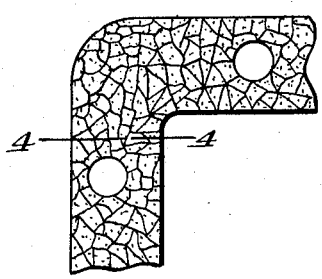
Inventor
William M. West
By Cushman, Darby & Cushman
Attorneys Patented July 27, 1937

2,087,942

UNITED STATES PATENT OFFICE 2,087,942

CORK COMPOSITION

William M. West, Baltimore, Md., assignor to Crown Cork & Seal Company, Inc., Baltimore, Md., a corporation of New York Application May 22, 1935, Serial No. 22,891

4 Claims. (Cl. 106—22)

The present invention relates to an improved composition useful particularly as a sealing material. The composition includes a comminuted material such as cork, asbestos fibers, or paper fibers or mixtures thereof which constitute the body material and a binder of synthetic rubber-like material of the type now commercially known as "Duprene" and chemically described as polymerized chlorobutadiene.

I have discovered that for automotive purposes, gaskets constructed of this material have a long life and a high resistance to the action of water and moisture, gases, temperature changes and the action of oils and other organic solvents such as naphtha, benzine and gasoline. Particularly, the cork composition is free for disintegration when used in an internal combustion engine, where it is exposed to the action of high temperatures and hot oils and other hydrocarbon liquids and gases.

The sealing material or composition is characterized by resilience and flexibility, resistance to the conditions above described and toughness and tensile strength rendering it suitable for a wide range of applications as well as for sealing purposes.

In carrying out the invention "Duprene" and a softening agent such as stearic acid together with a toughening agent such as zinc oxide are mixed in a suitable "Banbury mixer", keeping the rolls cooled if necessary. Thereafter, a suitable vulcanizing agent such as sulphur and an accelerator are added and milled with the mixture. There is then added for example, comminuted cork, asbestos fibers, paper pulp or disintegrated paper, or mixtures of these and they are thoroughly incorporated with the binder.

When the mixture leaves the "Banbury" it is in a somewhat dry and crumbly condition and may be sheeted on a mill and then calendered onto a cloth backing. The calendered material may be vulcanized as a roll or individual pieces may be vulcanized in steam heated platens under pressure.

If it is not desired to follow this procedure, the mixture from the "Banbury" is placed in molds of any size and shape and vulcanized under pressure therein.

When it is desired to make a dense material, talc or whiting are added with the "Duprene", stearic acid and zinc oxide.

In some cases, a very soft sealing material is desired, and in that case, I add bodied China wood oil, mixing the same with the "Duprene", zinc oxide and stearic acid. By a bodied China wood oil, I mean a polymerized tung oil.

If a more tacky material is desired, a suitable natural resin or synthetic resin is added, preferably a natural resin, such as a wood rosin or cumar gum and this material is usually mixed with the "Duprene", stearic acid and zinc oxide.

It is preferable to have the body material of comminuted cork or fibers predominate by volume with a sufficient amount of the binder to render the material flexible and resilient and resistant for the purposes to which the product is applied. In this connection, the body material for example, cork does not lose its cork properties or flexibility and resilience and they appear to be enhanced by the use of the "Duprene" binder.

A suitable composition, for example, will consist of the following:

|  | Pounds |
| --- | --- |
| Duprene | 200 |
| Stearic acid | 2 |
| Zinc oxide | 15 |
| Sulfur | 2 |
| Accelerator | 1½ |
| Cork | 810 |

With this composition, the Duprene, stearic acid, and zinc oxide are mixed for five minutes in a "Banbury", keeping the rolls cooled with cold water. The sulfur and accelerator are then added and the mixture milled for about three minutes. In this connection, any suitable accelerator may be used, e. g., "Thionex", "Tuads" or "Ureka C". Thereafter, the cork is added and the mass is milled for five or ten minutes depending upon the size of the cork. For example, particles which pass a twelve mesh and are retained on a twenty-four mesh are preferably mixed for about five minutes while particles which pass through a thirty mesh and are retained on a hundred mesh are usually milled or mixed for about ten minutes.

It is to be understood of course that the proportion of binder to body material will be varied in accordance with the product desired. Thus, if a more rubber-like material is required, the quantity of cork may be reduced, for example, to about 500 lbs.

It is found that the composition is flexible and resilient, resistant to water and moisture, gases and to the action of hot oils and other organic solvents. Likewise, the composition does not disintegrate or swell in the presence of organic materials or solvents at low temperatures or at elevated temperature.

The composition material as delivered from the "Banbury" will have a substantially dry or crumbly character as heretofore stated but if a tacky mixture is desired, a suitable resinous material as described will be added to the mixture. While I referred to natural resins, suitable synthetic resins of the phenol aldehyde and urea aldehyde type may be employed which are mixed in the binder in an initial or intermediate stage and converted to a final stage by the subsequent operation of vulcanizing the "Duprene" under heat and/or pressure.

As stated, the material is preferably sheeted on a mill and calendered onto cloth, formed into a roll and vulcanized in the roll. However, large pieces, for example, 60" x 60" may be vulcanized under pressure in steam heated platens. Again, the crumbly or tacky mixture may be placed in molds, for example, 24" x 60" and vulcanized under pressure.

The cork composition may be formed as blocks, rolls or sheets. Also, gaskets of any suitable size or shape or thickness may be either molded from the cork composition or stamped or punched from sheets thereof.

I refer herein to a rubber-like binder of "Duprene". By "Duprene" I mean an organic chlorinated product as described in "The DuPont Magazine" of March 1935, and further described in "Science of Rubber" by Memmler, Reinhold Publishing Corporation (1934), and also as sold by The Du Pont de Nemours Corporation of Wilmington, Delaware.

As heretofore stated, a gasket constructed from the composition of the present invention has particular utility in connection with internal combustion engines where high temperatures are encountered together with hot oils, gases, and hydrocarbon solvents which normally act to disintegrate a gasket, and/or weaken the binder.

Referring to the drawing,

Figure 1 shows in section, an internal combustion engine,

Figure 2 is a top elevation of a gasket constructed in accordance with the present invention, Figure 3 is a detail view of a portion of the gasket shown in Figure 2 wherein the body material will consist of comminuted cork and Figure 4 is a section on the line 4—4 of Figure 3.

The numeral 10 indicates as a whole, the internal combustion engine having a gasket 11 interposed between the sections 12, 13 of the crank case. This gasket, of course, will be of any suitable size or shape and include a port 14 and suitable bolt openings 15, if necessary. A similar gasket 11 is interposed between the top section 13 of the crank case and the adjacent cylinder 16 as well as between the top section 13 and the usual crank case 17.

The sealing material or gasket formed therefrom may be used in a large number of applications in addition to the very exacting requirements of internal combustion engine service and as stated, the gaskets may be of any desired size, shape or thickness.

In this connection, I make a gasket in accordance with the construction shown in the patent to Balfe No. 1,776,140. Any of the body materials herein described may be used but I prefer to form the cushion gasket material layers of asbestos fibers united by the "Duprene" binder.

While I have referred herein to a toughening agent, such as zinc oxide, it is to be understood that this is purely exemplary and that any other suitable toughening agents may be utilized. Likewise, the provision of softening agents such as stearic acid and bodied China-wood oil, is exemplary in that other suitable materials now commercially available may be used with equal facility and effect. Sulfur is, of course, preferred as the vulcanizing agent but vulcanization may be accomplished in other ways and with other agents. The accelerators used are all available commercially and one or more thereof may be employed or other similarly available accelerators may be utilized.

As also stated, the bodied material will consist of comminuted cork, asbestos fibers, paper pulp, or disintegrated paper fibers. Also, the body material may consist of a mixture of cork and asbestos or cork and paper fibers as well as a mixture of asbestos and paper fibers, or cork, asbestos and paper fibers. By paper fiber, I mean paper pulp, disintegrated paper or disintegrated paper fibers.

The body material will preferably predominate by volume and it is used in amount to produce a tough resistant product without, however, impairing the characteristic properties of the body material. Of course, the binder may be used in larger amounts or the body material in lesser amount in accordance with the product desired. However, for gasket purposes, it is preferred that the body material be present in amount to insure the desired resilience and flexibility and that the binder be present in a quantity to form a strong bond and render the gasket resistant to the action of organic solvents, gases and water without impairing the resilient and flexible properties of the body material and in fact enhance these qualities in the final gasket.

Where talc or whiting are employed or China-wood oil or a tacky material, these will be used in sufficient quantities to impart the desired properties to the product.

A suitable composition can be made with a body material, "Duprene", a vulcanizing agent and an accelerator. The other constituents may be omitted or one or more thereof are used to impart definite properties to the final product.

While the product of this invention is particularly useful for sealing purposes, it is not limited in its application. That is, the composition may be employed to meet the requirements of a wide range of conditions and hence is useful generally.

The term "crumbly" as used herein is intended to define a state of plasticity of the mixture as removed from the mixer whereby it may be readily molded or sheeted. The term "tacky" defines a state of the mixture wherein it is not only plastic but adhesive or sticky as well.

The operation of preparing the composition preferably includes three distinct steps:

(1) Mixing the "Duprene" with a softening agent, e. g., stearic acid and a toughening agent, e. g., zinc oxide (with or without one, two, or all of (a) a softening agent, e. g., bodied tung oil, (b) a substance imparting tackiness, e. g., a natural or synthetic resin, and (c) a density imparting agent, e. g., whiting or talc).

(2) Adding to such mixture and mixing therewith a rubber vulcanizing agent with or without an accelerator.

(3) Adding to such mixture and mixing therewith the body material, and producing a plastic composition, e. g., either crumbly or tacky.

(4) Forming the mixture.

(5) Vulcanizing the mixture under heat and/or pressure.

This procedure may, of course, be departed from but I find that it results in a very satisfactory composition.

The invention is capable of various modifications and changes all of which are considered to be comprehended within the scope of the appended claims.

I claim:

1. A cork composition comprising cork granules and polymerized chlorobutadiene in amount to constitute a binder, said cork predominating by volume.

2. A cork composition comprising cork granules and a binder including polymerized chlorobutadiene and bodied tung oil, said cork predominating by volume.

3. A cork composition comprising cork granules and a binder including polymerized chlorobutadiene and a resin, said cork predominating by volume.

4. A cork composition comprising cork granules and a binder including a resin, bodied tung oil, and polymerized chlorobutadiene, said cork predominating by volume.

WILLIAM M. WEST.